(12) United States Patent
Julienne

(10) Patent No.: US 6,529,184 B1
(45) Date of Patent: Mar. 4, 2003

(54) BALL PATTERN ARCHITECTURE

(75) Inventor: Christensen M. Julienne, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/532,780

(22) Filed: Mar. 22, 2000

(51) Int. Cl.$^7$ .................................................. G09G 5/00
(52) U.S. Cl. ...................... 345/157; 345/163; 345/164; 345/165; 345/166; 345/167; 359/154; 359/155; 359/223; 359/226
(58) Field of Search ................................. 345/157, 166, 345/167, 163, 164, 165; 359/154, 155, 223, 226

(56) References Cited

U.S. PATENT DOCUMENTS

| | | | |
|---|---|---|---|
| 3,541,521 A | 11/1970 | Koster | |
| 3,541,541 A | 11/1970 | Engelbart | |
| 3,656,154 A | 4/1972 | Ross et al. | |
| 3,835,464 A | 9/1974 | Rider | |
| 3,892,963 A | 7/1975 | Hawley et al. | |
| 3,987,685 A | 10/1976 | Opocensky | |
| 4,303,914 A | 12/1981 | Page | |
| 4,339,954 A | 7/1982 | Anson et al. | |
| 4,364,035 A | 12/1982 | Kirsch | |
| 4,369,439 A | 1/1983 | Broos | |
| 4,390,873 A | 6/1983 | Kirsch | |
| 4,409,479 A | * 10/1983 | Sprague et al. | ............. 340/709 |
| 4,521,772 A | 6/1985 | Lyon | |
| 4,521,773 A | 6/1985 | Lyon | |
| 4,531,230 A | 7/1985 | Brogardh | |
| 4,546,347 A | 10/1985 | Kirsch | |
| 4,550,250 A | 10/1985 | Mueller et al. | |
| 4,550,316 A | 10/1985 | Whetstone et al. | |
| 4,604,725 A | 8/1986 | Davies et al. | |
| 4,647,771 A | 3/1987 | Kato | |
| 4,678,910 A | 7/1987 | Hara et al. | |
| 4,698,626 A | 10/1987 | Sato et al. | |

(List continued on next page.)

FOREIGN PATENT DOCUMENTS

| | | |
|---|---|---|
| EP | 0 076 032 | 6/1983 |
| EP | 0 081 348 | 6/1983 |
| EP | 0 420 172 | 4/1991 |

OTHER PUBLICATIONS

The Optical Mouse, and an Architectural Methodology for Smart Digital Sensors, Richard F. Lyon, Aug. 1981—XEROX Corporation.

Computer–aided design: Mouse tracks path by electronics only, Stephen W. Fields. 8032 Electronics International, vol. 55 (1982) Oct. No. 21, New York, USA, Oct. 20, 1982, pp. 48–49.

XEROX Disclosure Journal, Optical Pen Mouse, Anonymous, vol. 10, No. 3, May/Jun. 1985, pp. 123–125.

Web page—http://www.hp.com/HP–COMP/promo/irmouse2.html. Electronic Components, HP revolutionizes mouse technology, May 26, 1999, p. 1 of 1.

HP revolutionizes mouse technology: Hewlett–Packard HDNS–2000 Solid–state Optical Mouse Sensor, Apr. 1999.

*Primary Examiner*—Richard Hjerpe
*Assistant Examiner*—Abbas Abdulselam
(74) *Attorney, Agent, or Firm*—Banner & Witcoff, Ltd.

(57) ABSTRACT

A methodology is provided for build-up of a variety of aesthetically pleasing highly ordered patterns which may, by known print processes, be applied to cover the entire spherical surface of a ball used in a computer input device, to thereby render the ball optically trackable with known optical tracking engines. While highly regular in order and appearance, the patterns resulting from the inventive methodology have an inherent or natural geometric variability permitting the patterns to be tracked without aliasing effects and associated cursor jump or skip encountered with previous attempts to optically track a regular arrangement of pattern elements.

18 Claims, 5 Drawing Sheets

U.S. PATENT DOCUMENTS

| | | | |
|---|---|---|---|
| 4,720,631 A | 1/1988 | Lapeyre | |
| 4,751,380 A | 6/1988 | Victor et al. | |
| 4,794,384 A | 12/1988 | Jackson | |
| 4,799,055 A | 1/1989 | Nestler et al. | |
| 4,812,833 A | 3/1989 | Shimauchi | |
| 4,814,553 A | 3/1989 | Joyce | |
| 4,834,502 A | 5/1989 | Bristol et al. | |
| 4,857,903 A | 8/1989 | Zalenski | |
| 4,868,551 A | 9/1989 | Arditty et al. | |
| 4,920,260 A | 4/1990 | Victor et al. | |
| 4,922,236 A | 5/1990 | Heady | |
| 4,927,987 A | 5/1990 | Kirchgessner | |
| 5,008,528 A | 4/1991 | Duchon | |
| 5,015,070 A | 5/1991 | Montgomery et al. | |
| 5,027,115 A | 6/1991 | Sato et al. | |
| 5,061,860 A | 10/1991 | Takemori | |
| 5,122,654 A | 6/1992 | Koh et al. | |
| 5,149,980 A | 9/1992 | Ertel et al. | |
| 5,210,405 A | 5/1993 | Toyoda et al. | |
| 5,223,709 A | 6/1993 | Pettypiece, Jr. | |
| 5,256,913 A | 10/1993 | Sommer | |
| 5,274,361 A | 12/1993 | Snow | |
| 5,288,993 A | 2/1994 | Bidiville et al. | |
| 5,298,919 A * | 3/1994 | Chang | 345/163 |
| 5,347,275 A | 9/1994 | Lau | |
| 5,349,371 A | 9/1994 | Fong | |
| 5,355,148 A | 10/1994 | Anderson | |
| 5,386,089 A * | 1/1995 | Tooi | 345/158 |
| 5,391,868 A | 2/1995 | Vampola et al. | |
| 5,442,147 A | 8/1995 | Burns et al. | |
| 5,488,204 A | 1/1996 | Mead et al. | |
| 5,578,817 A | 11/1996 | Bidiville et al. | |
| 5,583,541 A | 12/1996 | Solhjell | |
| 5,635,956 A | 6/1997 | Tak | |
| 5,703,356 A | 12/1997 | Bidiville et al. | |
| 5,729,008 A | 3/1998 | Blalock et al. | |
| 5,729,009 A | 3/1998 | Dändliker et al. | |
| 5,739,822 A * | 4/1998 | Paradine | 345/419 |
| 5,854,482 A | 12/1998 | Bidiville et al. | |
| 5,907,152 A | 5/1999 | Dändliker et al. | |
| 6,172,665 B1 * | 1/2001 | Bullister | 345/163 |
| 6,271,856 B1 * | 8/2001 | Krishnamurthy | 345/429 |

* cited by examiner

BALL PATTERN ARCHITECTURE

TECHNICAL FIELD

The present invention relates generally to computer input devices, and particularly to computer input devices (e.g., a mouse or trackball) employing a ball which is rotated and tracked to provide control signals to a computer system. More specifically, the invention concerns the generation of ordered patterns for application to the spherical surface of such a ball, which enable movement of the ball to be reliably tracked by known optical tracking engines.

BACKGROUND OF THE INVENTION

A traditional computer input device, such as a mouse, includes a housing with a ball mounted in the housing. In the well known computer mouse, the ball mount is configured such that the ball engages a work surface and rotates based upon the user's movement of the mouse across a work surface. Alternatively, the ball may be mounted within a trackball device, and rotated by a user's direct digital manipulation. In either case, most conventionally, rotary optical-mechanical position encoders are used to detect rotation of the ball in its mount, and to provide position information indicative of that rotation to an associated computer. In most instances, the position information is used to control movement of a visual image (such as a cursor) on the display screen of the computer.

More recently, direct optical tracking of a ball has been proposed for a cursor control device, as a desirable alternative to conventional optical-mechanical encoder-type tracking devices. For example, Sato U.S. Pat. No. 5,027,115 discloses a pen-type computer input device having a ball with a golf ball-like pattern of lands and recesses. Photosensors arrayed along X and Y axes detect the lands and recesses as they move, thereby detecting the distance traversed by the ball. A similar arrangement is disclosed in Xerox Disclosure Journal Vol. 10, No. 3 May/June 1985. A ball similar in appearance to a golf ball is marked with a feature pattern comprising a uniform pattern of light dots on a dark background or a uniform pattern of dark dots on a light background, or alternatively golf ball-like dimples. An LED light source illuminates a ball pattern area and a sensor detects a series of patterns produced from rotation of the ball; the series of patterns are used to determine the amount and direction of ball movement.

A problem has been found to arise with attempts to optically track a regular or uniform ball surface patterns such as those disclosed in the aforementioned references. In particular, attempts to track such regular patterns, with known tracking engines, can give rise to aliasing effects resulting in associated cursor jump or skip. Aliasing arises due to an inability of the processing means to effectively discriminate between successive ball pattern surface area images received by the optical sensing means.

Bidiville et al. U.S. Pat. No. 5,703,356 discloses a cursor control device utilizing a ball with its surface covered with a plurality of randomly shaped markings, providing an overall effect of a randomly speckled ball. A pattern area is illuminated with a monochromatic light source, and a sensor having an array of photosensitive elements receives an image reflected from the pattern area. "Biologically inspired" circuitry associated with the sensor determines movement of the pattern across the array, and translates the movement into conventional control signals supplied to a host system. Bidiville et al's use of a random, irregularly patterned ball surface pattern addresses the aliasing problem that can arise with attempts to track a regular ball surface pattern. Through use of surface pattern irregularity, successive "snapshots" of the ball surface pattern detected by the sensor may be distinguished from each other by the processing means, thereby avoiding aliasing induced jump or skip of the cursor.

While seemingly effective in avoiding aliasing related tracking problems, the Bidiville et al. ball patterns are necessarily irregular and random in appearance; regular patterns are excluded. This may be undesirable from an aesthetic or industrial design perspective. A design architecture permitting generation of a variety of regular ordered patterns that do not, when tracked, induce adverse aliasing effects, would be highly desirable. It would permit greater artistic freedom in the design of aesthetically pleasing ball patterns, and at the same time enable reliable tracking of the ball by known optical tracking engines.

SUMMARY OF THE INVENTION

In a first aspect, the invention provides a method of creating an ordered surface pattern to be applied to a ball of a computer input device. In accordance with the invention, an individual ball pattern design element is selected and replicated to create a plurality of like design elements. The like design elements are arranged in predetermined relation to a grid pattern established in relation to a sub-element of the ball's spherical surface. The sub-element is defined as one of three radially symmetrical sub-elements obtained by dividing the ball's spherical surface into octants and subdividing one of the octants. The grid pattern includes first and second sets of intersecting grid lines.

In a second related aspect, the invention provides a method of providing a ball for use in a computer input device with an optically trackable spherical surface, by printing on the ball's spherical surface an ordered surface pattern area having the unique characteristics just described.

In a third related aspect, the invention provides a ball for use in a computer input device. The ball has a spherical surface bearing an ordered surface pattern having the unique characteristics just described, for permitting movement of the ball to be optically tracked.

The above and other features and advantages of the present invention will be readily apparent and fully understood from the following detailed description of preferred embodiments, taken in connection with the appended drawings.

DETAILED DESCRIPTION OF THE PREFERRED EMBODIMENTS

In accordance with the invention, a methodology is provided for building-up a variety of ordered patterns for application to a ball of a computer input device, e.g., a mouse or trackball. Preferably, but not necessarily, the methodology of the present invention is carried out with the aid of a computer and known computer aided design (CAD), graphic arts and/or drawing software packages, e.g., Adobe Illustrator. Using known printing processes, the patterns may first be mapped to respective printing surfaces of a split tool capable of printing on spherical surfaces, and then printed onto the spherical surface of a ball to cover the entirety of the same. Companies knowledgeable of printing processes, apparatus and materials suitable for printing the patterns of the invention on a ball for use in a computer input device include Saluc, S.A. of Callenelle, Belgium, and Shin Bing Rubber Co., Ltd. of Shanghai China.

Once applied to a ball, the ordered patterns of the invention render the ball optically trackable with known optical tracking engines. Such tracking engines include, e.g., optical tracking engines as may be assembled from Hewlett Packard's Solid-State Optical Mouse Sensor Designer's Kit, which operate with an LED light source and are based on HP's HDNS-2000 sensor. While patterns produced in accordance with the invention may be highly regular in order and appearance, the patterns have an inherent or natural geometric variability permitting the patterns (and hence the ball) to be reliably optically tracked. Aliasing effects and associated cursor jump or skip, as encountered with previous attempts to optically track a regular arrangement of pattern elements, are avoided. At the same time, a variety of interesting and appealing visual effects can be achieved, in a highly efficient design process.

Figure 1:
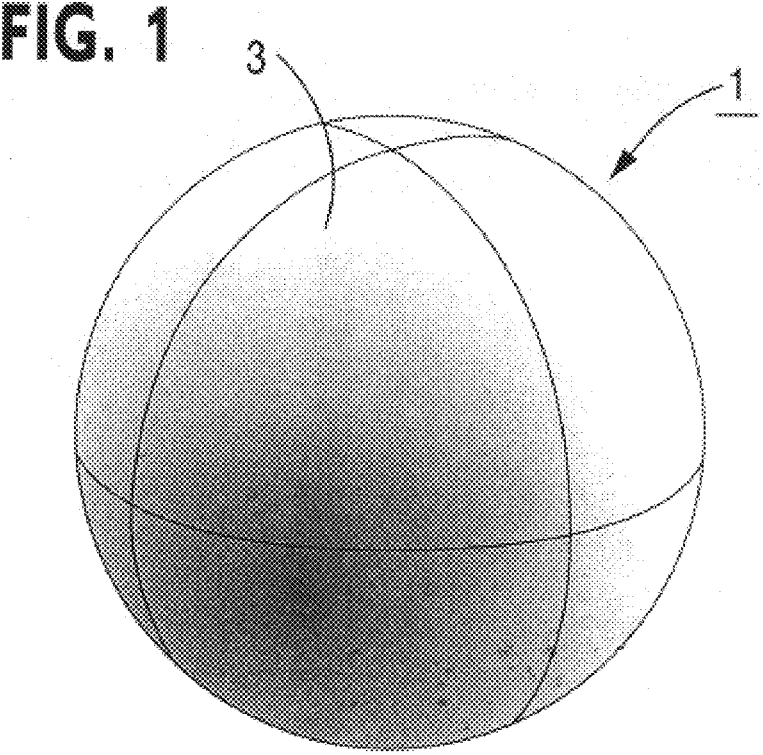
FIG. 1 is a diagrammatic perspective view of a ball for use in a computer input device, with its surface area divided into octants in accordance with the methodology of the present invention.
Figure 2:
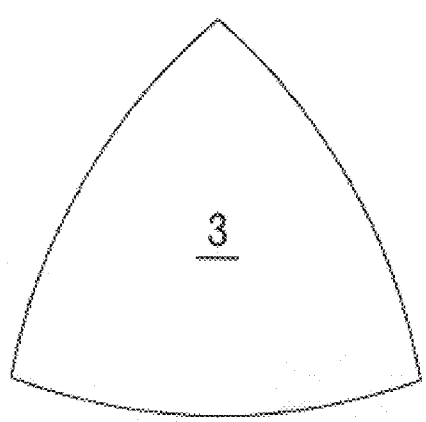
FIG. 2 is a diagrammatic representation of a single one of the octants of FIG. 1, as it appears mapped onto a flat surface.

Referring to FIG. 1, a ball 1 of a computer input device is diagrammatically depicted. An overall pattern for application to the spherical surface of ball 1 is built-up from a small pattern area defined within a basic geometric sub-part of the spherical surface. The small pattern area defined within the basic sub-part is repeated in symmetrical fashion over the entire spherical surface of ball 1. To obtain the basic geometric sub-part, the spherical surface area of ball 1 is first divided into octants 3. As shown in FIG. 2, each octant 3 has, when mapped onto a flat surface, the general shape of an equilateral triangle with outwardly bowed sides. Octants 3 are arranged on the surface of ball 1 such that any group of four adjacent octants 3 exhibits radial symmetry with respect to an adjoining apex of the octants. Together, any four adjacent octants 3 represent a hemispherical surface area of the ball.

Figure 3:
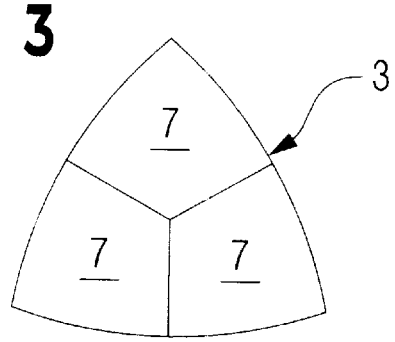
FIG. 3 shows the octant of FIG. 2 divided into three radially symmetrical sub-elements, in accordance with the present invention.
Figure 7:
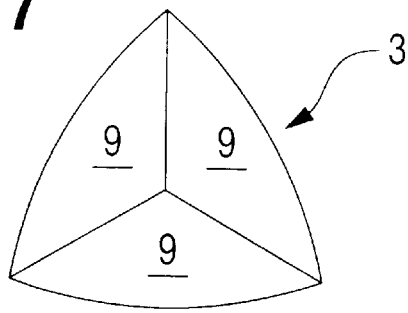
FIG. 7 shows an alternative way of dividing the octant of FIG. 2 into radially symmetrical sub-elements, in accordance with the invention.
Figure 4:
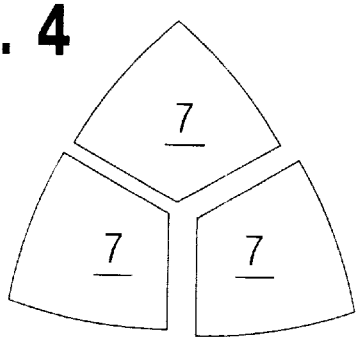
FIG. 4 shows the sub-elements depicted in FIG. 3 separated from each other.
Figure 8:
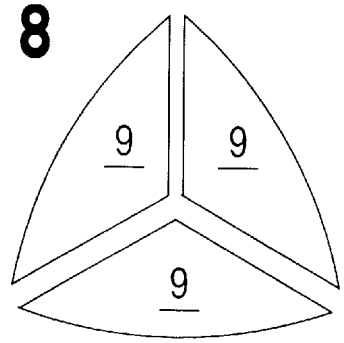
FIG. 8 shows the sub-elements of FIG. 7 separated from each other.
Figure 5:
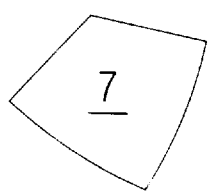
FIG. 5 shows a single one of the three sub-elements depicted in FIG. 4.
Figure 9:
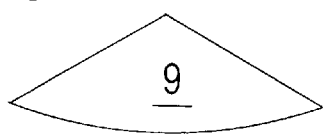
FIG. 9 shows a single one of the three sub-elements depicted in FIG. 8.
Figure 6:
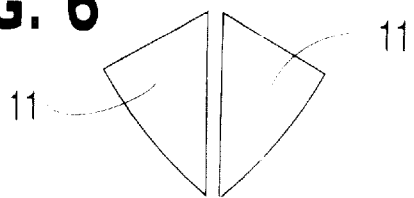
FIG. 6 shows the sub-element of FIG. 5 further subdivided into two bilaterally symmetrical halves, to thereby provide a basic geometric sub-part in accordance with the invention.
Figure 10:
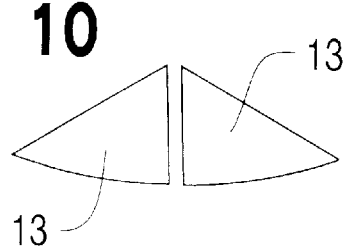
FIG. 10 shows the sub-element of FIG. 9 further subdivided into two bilaterally symmetrical halves, to thereby provide an alternative basic geometric sub-part in accordance with the invention.
Figure 13:
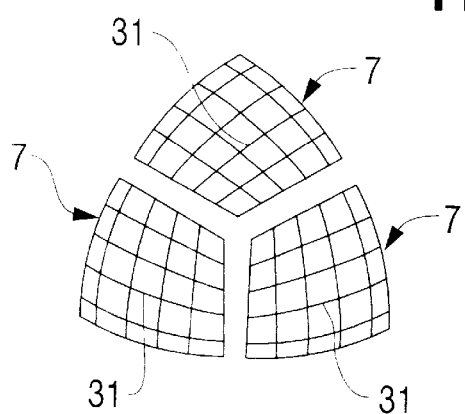
FIG. 13 shows three of the gridded sub-elements of FIG. 12 arranged in a radially symmetrical relationship.

Next, generally triangular octants 3 are sub-divided into three radially symmetrical sub-elements. A first approach for making this subdivision results in three four-sided radially symmetrical sub-elements 7, as shown in FIGS. 3–5. Alternatively, the subdivision shown in FIGS. 7–9 can be made, resulting in three symmetrically arranged generally triangular sub-elements 9. These sub-elements (7 or 9) are then further divided to create bilaterally symmetrical, generally triangular, halves. These halves constitute the basic geometric sub-part (11 as shown in FIG. 6, or 13 as shown in FIG. 10). These sub-parts are "basic" in the sense that they cannot be further sub-divided into smaller elements exhibiting either radial or bilateral symmetry with respect to each other.

Figure 11:
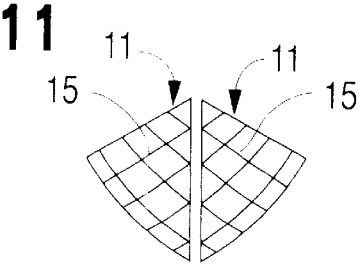
FIG. 11 shows the basic sub-parts of FIG. 6, with grid patterns established thereon for use in positioning individual design elements in accordance with the invention.

Referring next to FIG. 11, grid patterns 15 are established, which correspond to the basic geometric sub-parts (sub-parts 11 chosen as exemplary). Reflecting the overall shape of a sub-element 7 comprising a pair of basic sub-parts 1 1, the lines of grid pattern 15 exhibit a natural gradation or "morphing" of curvature. In particular, a first group of generally parallel grid lines 17 exhibit a gradation of curvature progressing from little to no visibly discernable curvature adjacent a first inner rectilinear border 19 of sub-element 7, to a clearly visibly discernable curvature adjacent an arcuate outer border 21 opposite border 19. Similarly, a second group of generally parallel grid lines 23, which intersect grid lines 17, exhibit a like gradation of curvature progressing from a second rectilinear border 25 of sub-element 7 to a second arcuate outer border 27 opposite border 25. In this manner, the grid lines generally follow and reflect the overall shape of sub-element 7. A suitable gradation of curvature of the grid lines may, e.g., be obtained through use of a "blend" or "morphing" functionality of a drawing software program, e.g., Adobe Illustrator.

Figure 12:
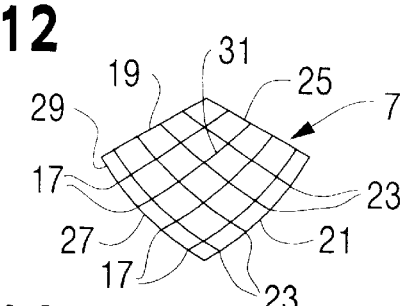
FIG. 12 shows the two grid patterns of FIG. 11 adjoined to form a gridded sub-element corresponding to the sub-element of FIG. 5.
Figure 14:
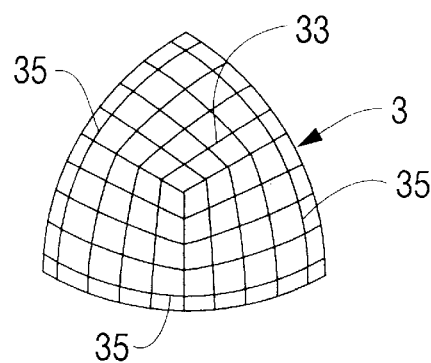
FIG. 14 shows the gridded sub-parts of FIG. 13 adjoined to form a gridded octant corresponding to FIG. 2.
Figure 15:
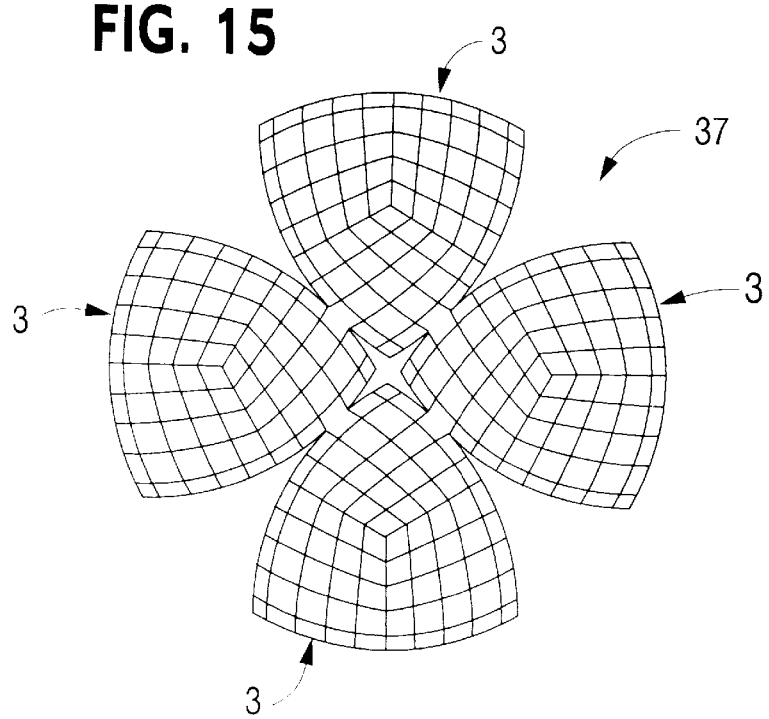
FIG. 15 shows four gridded octants adjoined in radially symmetrical relation to form the framework of a four-lobed surface pattern area that may be mapped onto a hemisphere of a ball.

Two grid patterns 15, when adjoined, form a composite grid pattern 31 corresponding in shape and size to a sub-element 7, as seen in FIG. 12. FIGS. 13 and 14 illustrate how three of the gridded octants 7 may be adjoined with each other, in radially symmetrical relation, to form a composite (octant) grid pattern 33 corresponding in shape and size to octants 3. Finally, as seen in FIG. 15, four octant grid patterns 33 may be adjoined in radially symmetrical relation to produce a four-lobed grid pattern 37. Grid pattern 37 represents the framework underlying the inventive surface pattern area for covering a hemisphere of ball 1.

Grid pattern 37 serves as the basis for creating an ordered arrangement of individual ball pattern design elements. One or more individual design elements are replicated and arranged in relation to grid pattern 37, e.g., at the intersections of the grid lines and/or in the spaces between the grid lines. Placement of the elements in relation to the grid pattern may be carried out following a complete build-up of grid pattern 37. Alternatively, arrangement of the design pattern elements may be carried out on a sub-part of grid pattern 37 (i.e., octant grid pattern 33, sub-element grid pattern 31 or basic grid pattern 15), and then that pattern area sub-part may be replicated and properly arranged in symmetrical groupings to build-up a hemispherical ball pattern area. Generally, though not necessarily, grid pattern 37 is used only in creating the ordered arrangement of individual ball pattern elements, i.e., the grid pattern generally does not actually appear as part of the pattern(s) to be applied to a ball.

The size and spacing/density of the individual design elements are determined, and may be varied within the constraints imposed by, the resolution of the optical tracking engine to be utilized, as well as the desired tracking accuracy/tolerance. Advantageously, composite elements providing within a single element one or more transitions between relatively light and dark areas (e.g., the apertured parallelograms shown in FIG. 16) may be used to provide the visual appearance of relatively large elements which will be read as smaller elements by an optical tracking engine. The line spacing/density of the grid pattern may be based upon the desired size and spacing/density of the individual design elements (composite or otherwise). In addition to a constant spacing of the grid lines (as measured along the edge of an octant), it is contemplated that the grid spacings may vary in a predictable fashion, such as a logarithmic progression.

As seen in FIGS. 11–15, the lines of the grid patterns are spaced in a generally uniform manner. As shown, an outermost one of those grid lines 35 is positioned a half space away from the outer edge of each octant 3. When the four-lobed pattern area is applied to a hemisphere of ball 1, the edges of adjacent octants will come together, and the half spaces between the outermost grid lines of the adjacent octants will combine to form a spacing equal to the others. As an alternative, it is possible to lay-out the grid lines such that the outermost grid lines coincide with the border of each octant 3. In such an arrangement, no half-spaces, as are associated with outermost grid line 35, would be present.

The individual ball pattern design elements may be of virtually any chosen configuration. Preferably, however, in order to create an aesthetically pleasing regular and ordered appearance, the design elements are chosen from recognized geometric shapes, e.g., squares, diamonds, triangles, circles and stars, and variations and combinations of the same. In addition, it is preferable, although not necessary, that like pattern elements be utilized throughout each hemispherical ball pattern area to be applied to a ball. As used herein, the term "like" is intended to mean generally similar in configuration and/or appearance. As will be described, some variation among "like" ball pattern elements within a given ball pattern area is contemplated and even preferred.

Figure 16:
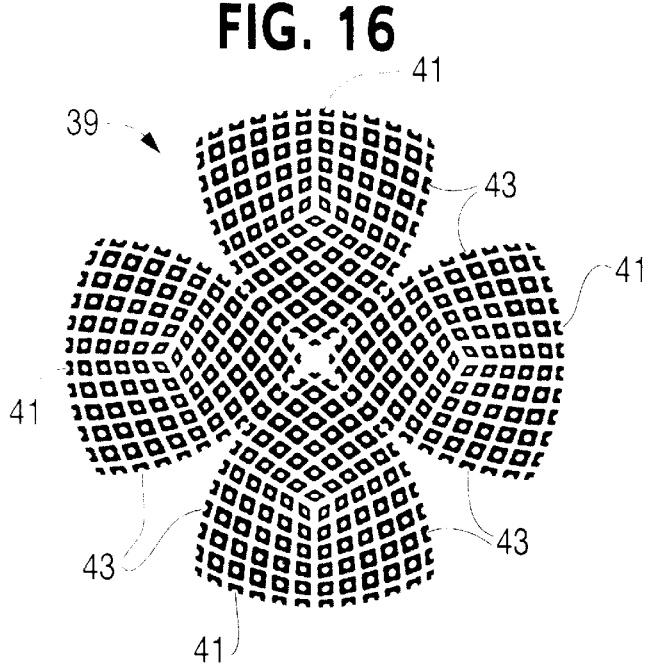
FIG. 16 shows a first four-lobed surface pattern area built-up from a first plurality of individual ball pattern elements positioned to fall within the spaces between the lines of the grid pattern of FIG. 15.
Figure 19:
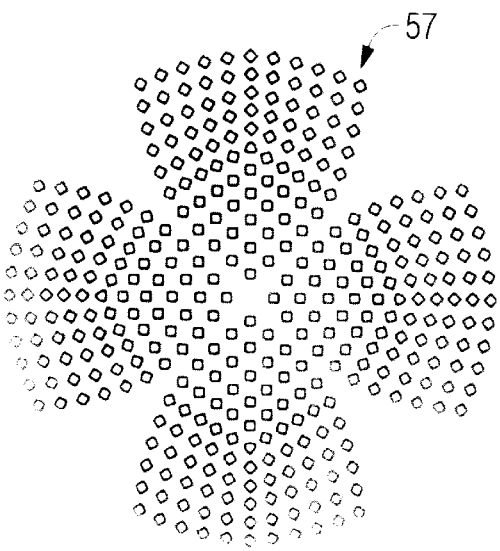
FIG. 19 shows a second four-lobed surface pattern area built-up from a second plurality of individual ball pattern elements positioned to fall at the intersection points of the lines of the grid pattern of FIG. 15.
Figure 20:
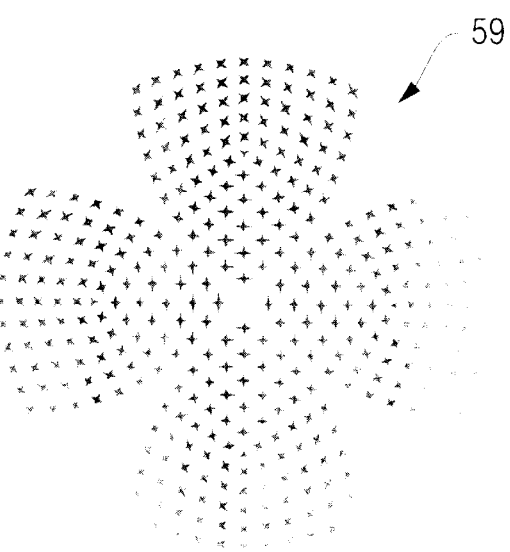
FIG. 20 shows a third four-lobed surface pattern area built-up from a third plurality of individual ball pattern elements positioned to fall at the intersection points of the lines of the grid pattern of FIG. 15.

Exemplary ball pattern surface areas serving to cover a hemisphere of ball 1 are shown in FIGS. 16, 19 and 20. Referring first to FIG. 16, illustrated is a pattern of individual design elements comprising parallelograms with centralized apertures. These elements are sized and arranged to fit within the spaces defined between the lines of grid pattern 37. The elements are generally alike. However, there is variation in the size and shape of the elements; the angles of the parallelograms are varied, as are the shapes/sizes of the apertures. This variation corresponds at least generally to the natural or inherent variation in the size and shape of the grid spaces. Such natural dimensional variation produces an interesting visual effect, and in addition allows the processing means of the optical tracking engine to distinguish between successive image areas, to thereby reduce or eliminate aliasing and associated cursor jump or skip.

Figure 17:
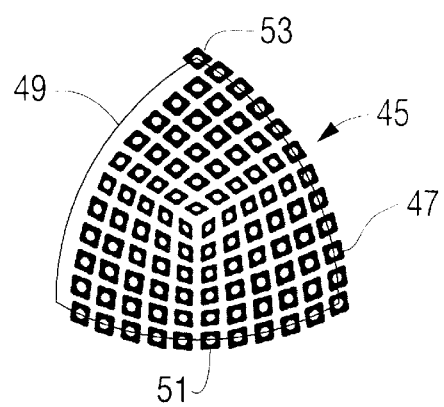
FIG. 17 shows an octant pattern area including individual ball pattern elements as shown in FIG. 16, which is modified to include outer rows of whole elements serving to avoid the need, in the printing process, to match-up half-elements along the outer pattern edges.
Figure 18:
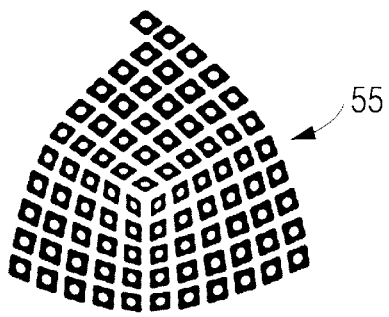
FIG. 18 shows a second modified octant pattern area for use in a hemispherical surface pattern area to be applied to a ball in registry with an opposing hemispherical pattern area built-up from modified octants as shown in FIG. 17.

As seen in FIG. 16, when the individual pattern elements are positioned within the spaces of grid 37, pattern elements along the edges of the pattern area are halved. Pattern area 39 may be applied in alignment and registry with a like pattern area applied to an opposing hemisphere of ball 1, whereupon an uninterrupted continuum of the surface pattern should exists across the equators formed between the octants, including a primary equator between the two like pattern areas 39 which are applied to opposing hemispheres. In the printing process, it can be difficult to obtain precise alignment and registry of the pattern element halves extending along the edges. This difficulty can be alleviated through adoption of modified octant pattern layouts as shown in FIGS. 17 and 18. In modified octant pattern layout 45 (FIG. 17), a row of whole pattern elements 47 along a right side of each octant takes the place of the corresponding row of half-elements seen in the octants of FIG. 16. On an opposite (left) side 49, the row of half-elements present in the FIG. 16 octants is omitted. In this manner, the need for precisely registering rows of halved individual design elements can be avoided, thus facilitating the printing process.

Similarly, in octant pattern layout 45 of FIG. 17, a lower row of whole pattern elements 51 that will run along the equator of an adjoining hemispherical ball pattern area is substituted for the corresponding half-elements 41 seen in FIG. 16. With a first hemisphere of ball 1 covered by adjoining octant pattern layouts as shown in FIG. 17, it is then appropriate to use, in the opposing hemispherical ball pattern area, a modified octant pattern layout 55, as shown in FIG. 18. Pattern layout 55 is identical to octant pattern layout 45, except for the omission (in the former) of bottom row 51 of whole pattern elements. In each of the hemispherical surface pattern areas to be used to cover ball 1, one of the four octant pattern layouts should include, at its upper apex, an extra pattern element 53 serving to fill the small space left the juncture of the octant apices.

Referring now to FIG. 19, a second four-lobed ball pattern area for covering a hemisphere of ball 1 comprises individual design elements in the form of small squares with centralized circular holes. In contrast to the pattern of FIG. 16, the ball pattern elements of FIG. 19 are arranged to fall on the points of intersection of grid pattern 37. A further difference is that the size and shape of the individual ball pattern elements of FIG. 19 remains substantially constant across the pattern. While the shape of the individual design elements remains constant, the positioning, orientation and spacing of the elements varies with the aforementioned natural gradation in curvature of the grid lines. This predictable and orderly variability facilitates discrimination by the image processing means between successive detected surface area images, thus avoiding adverse aliasing effects.

A third ball pattern area 59 is shown in FIG. 20. In this pattern, the individual design elements comprise star-like configurations positioned, like the elements of ball pattern area 57, at the intersection points of grid pattern 37. As can be seen, the positioning and spacing of these ball pattern elements varies with the natural gradation in curvature of the grid lines. In addition, the size of the individual ball pattern elements is varied in general relation to the variable size of the spaces formed between the grid lines. Again, this variability, while regular and predictable, avoids adverse aliasing effects.

Figure 21:
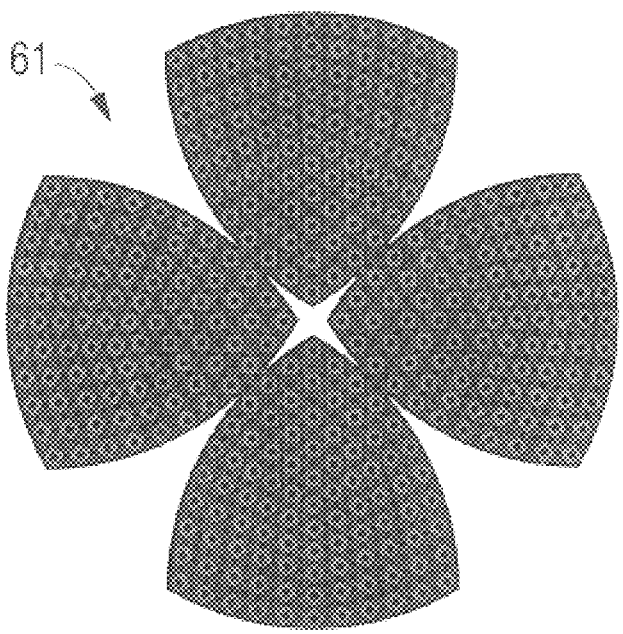
FIG. 21 shows a composite pattern area corresponding to a hemisphere of the ball shown in FIG. 1, formed by overlaying the pattern area of FIG. 19 on the pattern area of FIG. 16.
Figure 22:
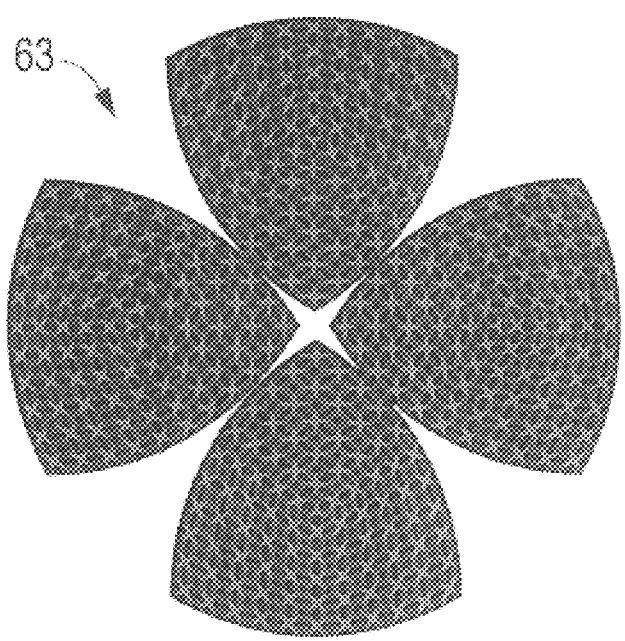
FIG. 22 shows a second composite pattern area corresponding to a hemisphere of the ball shown in FIG. 1, formed by overlaying the pattern area of FIG. 20 on the pattern area of FIG. 16.

In accordance with preferred embodiments of the invention, plural (two or more) ball pattern areas, such as those shown in FIGS. 16, 19 and 20, are applied to ball 1 in overlying relation, in successive printing steps. This technique can be used to achieve an aesthetically pleasing pattern with perceived depth, richness and texture. In addition, such composite patterns can provide additional sub-areas of relatively light and dark areas that can serve to facilitate optical tracking. As one example of the infinite variety of composite surface patterns attainable in accordance with the present invention, FIG. 21 shows, by way of a four-lobed two dimensional mapping, ball 1 printed with a surface pattern comprising an overlay of pattern 57 (FIG. 9) on pattern 39 (FIG. 16). Similarly, FIG. 22 represents ball 1 printed with a composite pattern formed by overlaying pattern 59 (FIG. 20) on pattern 39. Various inks and color combinations can be utilized (within the contrast sensitivity limitations of the optical tracking engine to be used). In an exemplary embodiment, a cast polyester resin ball having a dark black base surface is printed with a first pattern of ink which is medium silver or charcoal in color. A second pattern of lighter silver ink is overlaid on top of the first pattern. In order to provide durability and an attractive glossy appearance, the printed spherical ball surface may be sealed with a clear or tinted top coat.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A method of creating an ordered surface pattern to be applied to a ball of a computer input device, said method comprising:

selecting an individual ball pattern design element;

replicating the individual ball pattern design element to create a plurality of like design elements; and arranging the like design elements in predetermined relation to a grid pattern established in relation to a sub-element of the ball's spherical surface, said sub-element being defined as one of three radially symmetrical sub-elements obtained by dividing the ball's spherical surface into octants and subdividing one of the octants, said grid pattern comprising first and second sets of intersecting grid lines.

2. A method according to claim 1, wherein the like design elements are arranged to fall within spaces defined between the grid lines.

3. A method according to claim 1, wherein the like design elements are arranged to fall at points of intersection of the grid lines.

4. A method according to claim 1, wherein a shape and/or size of the like design elements varies in at least general relation to the varying shape and size of the spaces defined between the grid lines.

5. A method according to claim 1, wherein the like design elements are identical to each other.

6. A method according to claim 1, wherein the individual ball pattern design element is selected from the group of geometric shapes consisting of squares, diamonds, triangles, circles and stars.

7. A method according to claim 1, wherein the step of arranging the like design elements is carried out following a complete build-up of a four lobed radially symmetrical grid pattern corresponding to a hemispherical surface pattern area.

8. A method according to claim 1, wherein the step of arranging the like ball pattern elements is carried out on a sub-part of a four-lobed radially symmetrical grid pattern corresponding to a hemispherical surface pattern area, to thereby produce a surface pattern area sub-part, and wherein said surface pattern area sub-part is replicated and arranged to build-up a hemispherical surface pattern area.

9. A method of providing a ball for use in a computer input device with an optically trackable spherical surface, said method comprising printing on the ball's spherical surface an ordered surface pattern area including a plurality of like ball pattern design elements arranged in predetermined relation to a grid pattern established in relation to a sub-element of the ball's spherical surface, said sub-element being defined as one of three radially symmetrical sub-elements obtained by dividing the ball's spherical surface into octants and subdividing one of the octants, said grid pattern comprising first and second sets of intersecting grid lines.

10. A method according to claim 9, wherein said printing comprises printing on said ball, in registry with each other, a pair of opposed generally hemispherical surface pattern areas.

11. A method according to claim 9, wherein said printing step is repeated in order to produce a ball having a composite spherical surface pattern area comprising a plurality of surface pattern areas applied in overlying relation.

12. A ball for use in a computer input device, said ball having a spherical surface bearing an ordered surface pattern for permitting movement of the ball to be optically tracked, said ordered surface pattern comprising a plurality of like individual ball pattern design elements arranged in predetermined relation to a grid pattern established in relation to a sub-element of the ball's spherical surface, said sub-element being defined as one of three radially symmetrical sub-elements obtained by dividing the ball's spherical surface into octants and subdividing one of the octants, said grid pattern comprising first and second sets of intersecting grid lines.

13. A ball according to claim 12, wherein said ordered surface pattern is a composite spherical surface pattern comprising a plurality of surface pattern areas applied in overlying relation.

14. A ball according to claim 12, wherein the like ball pattern design elements are arranged to fall within spaces defined between the grid lines.

15. A ball according to claim 12, wherein the like ball pattern design elements are arranged to fall at points of intersection of the grid lines.

16. A ball according to claim 12, wherein a shape and/or size of the like ball pattern design elements varies in at least general relation to the varying shape and size of the spaces defined between the grid lines.

17. A ball according to claim 12, wherein the like ball pattern elements are identical to each other.

18. A ball according to claim 12, wherein the like ball pattern elements are selected from the group of geometric shapes consisting of squares, diamonds, triangles, circles and stars.

* * * * *

UNITED STATES PATENT AND TRADEMARK OFFICE
CERTIFICATE OF CORRECTION

PATENT NO.     : 6,529,184 B1                                              Page 1 of 1
DATED          : March 4, 2003
INVENTOR(S)    : Julienne M. Christensen It is certified that error appears in the above-identified patent and that said Letters Patent is hereby corrected as shown below:

<u>Title page,</u>
Item [12], United States Patent, "Julienne" has been replaced with -- Christensen --;
Item [75], Inventor, "Christensen M. Julienne" has been replaced with
-- Julienne M. Christensen --.

Signed and Sealed this

Seventh Day of October, 2003

JAMES E. ROGAN
*Director of the United States Patent and Trademark Office*